United States Patent [19]
Muneto et al.

[11] Patent Number: 5,239,054
[45] Date of Patent: Aug. 24, 1993

[54] TREATMENT OF POLYARYLENE SULFIDE RESINS WITH ZINC COMPOUND

[75] Inventors: Toshihiko Muneto; Toshikazu Kato; Hiroshi Inoue, all of Mie, Japan

[73] Assignee: Tosoh Corporation, Yamaguchi, Japan

[21] Appl. No.: 808,485

[22] Filed: Dec. 17, 1991

[30] Foreign Application Priority Data

Dec. 19, 1990 [JP] Japan .................................. 2-411710
Dec. 27, 1990 [JP] Japan .................................. 2-415068

[51] Int. Cl.$^5$ .............................................. C08G 75/16
[52] U.S. Cl. ................................... 528/485; 528/388; 528/488
[58] Field of Search ........................ 528/485, 488, 388

[56] References Cited

U.S. PATENT DOCUMENTS 5,015,702  5/1991  Scoggins et al. ..................... 528/485

FOREIGN PATENT DOCUMENTS 0280325  8/1988  European Pat. Off. .
0323175  7/1989  European Pat. Off. .
0427134  5/1991  European Pat. Off. .

Primary Examiner—Harold D. Anderson
Attorney, Agent, or Firm—Sughrue, Mion, Zinn, Macpeak & Seas

[57] ABSTRACT

The nuisance metal-corrosive property is effectively lowered by mixing an heating polyarylene sulfide resins with (i) zinc carbonate; (ii) zinc carbonate and an alkaline earth metal chloride; (iii) zinc oxide and/or hydroxide; or (iv) zinc oxide and/or hydroxide, and an alkaline earth metal chloride in the presence of a good solvent for the resins.

22 Claims, 1 Drawing Sheet

5,239,054

TREATMENT OF POLYARYLENE SULFIDE RESINS WITH ZINC COMPOUND

BACKGROUND OF THE INVENTION

1. Field of the Invention

This invention relates to a method for treating polyarylene sulfide resins and in particular to such a method by which the corrosive property of the resins is effectively reduced or diminished.

2. Prior Art

Polyarylene sulfide resins exhibit excellent heat and chemical resistance properties and high fire-retardant property and, hence, have attracted a good deal of attention as engineering plastics. The resins have been in increasing demand in various fields where the above-mentioned properties are wanted; for example, in the production of electrical and electronic parts, automotive parts, films, sheets and fibers. The resins have also good molding and forming characteristics and high insulation property. In order to meaningfully enjoy these advantageous properties of the polyarylene sulfide resins when employed in practice, it would be required to diminish or substantially eliminate the corrosive property of the resins. For example, where the resins are used as covering or encapsulating material for electronic parts, the material could corrode the electrode, wiring, conductor, leading frame and other metallic elements of the parts in use and often could result in functional trouble of the parts.

As a means to reduce the corrosive property, it has been proposed to chemically treat polyarylene sulfide polymers after polymerization or further purification stage. For example, Japanese Patent Application KOKAI 57-108136 describes a method for treating a polyarylene sulfide polymer which has been polymerized and purified, which comprises washing the polymer in an aqueous slurry containing a salt of metal from Group IA, II or IIIA of the periodic table, an organic acid, ammonia, a basic ammonia compound, or an alkali metal or alkaline earth metal hydroxide. Japanese Patent Application KOKAI 62-36425 describes a treatment method comprising mixing a polyarylene sulfide resin with an inorganic ion-exchanger in the presence of deionized water and/or N-methyl-2-pyrrolidone and heating the mixture. However, these known methods do not appear to be effective to sufficiently reduce the corrosive property of the polyarylene sulfide resins. Therefore, it is necessary to repeatedly conduct the same procedure to lower the corrosive property down to an acceptable level. Thus, the known methods would not be applicable in practice.

It is also known that zinc compounds are added to polyarylene sulfide resins; see, for example Japanese Patent Application KOKAI 1-135866. In this KOKAI specification, a polyarylene sulfide resin is melt-kneaded with zinc carbonate so as to retard the corrosive property and also stabilize the color tone. However, since polyarylene sulfide resins exhibit high melting temperature, the zinc carbonate additive, which decomposes at 300° C. while evolving carbon dioxide gas, tends to produce bubbles in the molded or shaped product and hence to lower the mechanical strength of the product and roughen the surface of product with the bubbles. These present problems in practice.

SUMMARY OF THE INVENTION

An object of the invention is to substantially eliminate the difficulties experienced with the prior art technique.

Another object of the invention is to provide an improved method for treating polyarylene sulfide resins so as to substantially lower the corrosive property.

A further object of the invention is to provide polyarylene sulfide resins which are less corrosive than the conventional similar resins.

In view of the status of prior art as above-discussed, we have intensively studied and researched to lower the metal corrosive property of polyarylene sulfide resins. Consequently, it has been found that the nuisance corrosive property is effectively lowered by mixing and heating polyarylene sulfide resins with (i) zinc carbonate; (ii) zinc carbonate and an alkaline earth metal chloride; (iii) zinc oxide and/or hydroxide; or (iv) zinc oxide and/or hydroxide, and an alkaline earth metal chloride in the presence of a good solvent for the resins.

Thus, according to the first aspect of the invention, there is provided a method for treating polyarylene sulfide resins which comprises mixing and heating a polyarylene sulfide resin with zinc carbonate in the presence of a good solvent for said resin, the zinc carbonate being present in a proportion of 0.01%–10% by weight on the basis of the total weight of the resin and zinc carbonate.

According to the second aspect of the invention there is provided a method for treating polyarylene sulfide resins which comprises mixing and heating a polyarylene sulfide resin with zinc carbonate and an alkaline earth metal chloride in the presence of a good solvent for the resin, the zinc carbonate and alkaline earth metal chloride being present in proportions of 0.01%–10% and 0.006%–23.6% by weight, respectively, on the basis of the total weight of the resin, zinc carbonate and alkaline earth metal chloride.

According to the third aspect of the invention there is provided a method for treating polyarylene sulfide resins which comprises mixing and heating a polyarylene sulfide resin with zinc oxide and/or zinc hydroxide in the presence of a good solvent for the resin, the zinc oxide and/or zinc hydroxide being present in proportion of 0.01%–10% by weight on the basis of the total weight of the resin and zinc oxide and/or hydroxide.

According to the fourth aspect of the invention there is provided a method for treating polyarylene sulfide resins which comprises mixing and heating a polyarylene sulfide resin with zinc oxide and/or zinc hydroxide and an alkaline earth metal chloride in the presence of a good solvent for the resin, the zinc oxide and/or zinc hydroxide and the alkaline earth metal chloride are present in proportions of 0.01%–10% and 0.008%–36.5% by weight, respectively, on the basis of the total weight of the resin and zinc oxide and/or hydroxide, and alkaline earth metal chloride.

DETAILED DESCRIPTION OF THE PREFERRED EMBODIMENT

Figure 1:
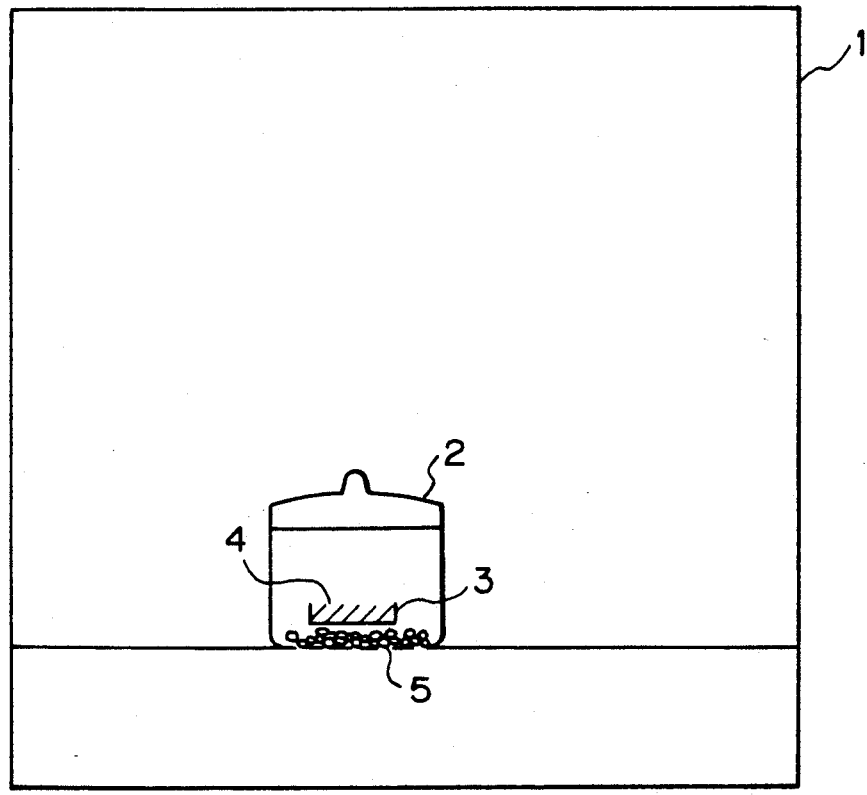
FIG. 1 schematically shows an experimental apparatus in which the corrosive property of polyarylene sulfide resins is assessed in the following Examples.

The polyarylene sulfide resins which may be treated in accordance with the invention include ones which contain repeating units represented by the general formula —Ar—S—. Particular examples of —Ar—S— which may be mentioned include the following structural units:

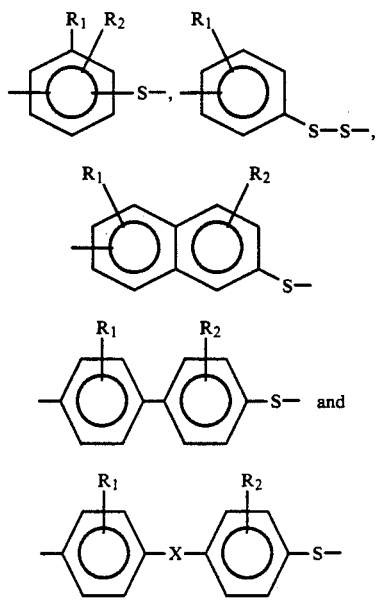

wherein each of $R_1$ and $R_2$ represents independently a hydrogen atom, alkyl group, phenyl group, alkoxy group, nitro group, halogen atom, alkyleneglycol group, hydroxyl group, nitrile group, carboxyl group, sulfone group or amino group and X represents a methylene, ethylene, isopropyl, ether, ketone or sulfone group.

Of these, a polyphenylene sulfide resin is particularly preferred. The polyphenylene sulfide resin may be one which contains at least 70 mole %, preferably at least 90 mole %, of repeating unit of structure

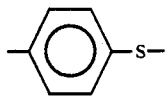

and optionally one or more other copolymerized units.

Usually, polyarylene sulfide resins include a class of relatively low molecular weight polymers which may be prepared by the known methods disclosed typically in Japanese Patent KOKOKU 44-2761; Japanese Patent KOKOKU 45-3368; U.S. Pat. No. 3,274,165; Japanese Patent KOKOKU 46-27255, etc., and a class of relatively high molecular weight, substantially linear polymers which may be prepared by the known methods disclosed, for example, in Japanese Patent KOKOKU 52-12240. The former class of polymers may be further polymerized by heating them either under an oxygen-containing atmosphere or in the presence of a cross-linking agent such as a peroxide, before they are used in the present invention.

The substantially linear, relatively high molecular weight polyarylene sulfide resins which are suitable for use in the invention have a melt viscosity in the range of about 50–50,000 poises, preferably 100–30,000 poises as measured in a KOHKA type flow tester at 300° C. using an orifice of a 0.5 mm diameter and a 2 mm length under a 10 kg load. The relatively low molecular weight polymers which are further polymerized by heating in the presence of a cross-linking agent before use in the invention may have a melt viscosity in the range of about 50–20,000 poises before that heating and an increased melt viscosity in the range of about 150–50,000 poises, preferably 200–30,000 poises, after that heating and further polymerization. Melt viscosities of less than about 50 poises tend to give rise to undesirably low mechanical strength of the product. On the other hand, melt viscosities of greater than about 50,000 poises tend to adversely affect the molding and forming characteristics.

The zinc carbonate agent used in the first and second aspects of the invention is basic zinc carbonate or zinc carbonate hydroxide which may be prepared by various processes and may be represented by the general formula:

$$xZnCO_3 \cdot yZn(OH)_2 \cdot nH_2O$$

wherein x is from 1 to 3, y is from 0 to 6 and n is from 0 to 6.

In the first aspect of the invention, the zinc carbonate is added in a proportion of the range 0.01%–10%, preferably 0.1%–5%, by weight on the basis of the total weight of the polyarylene sulfide resin and zinc carbonate. If the zinc carbonate is added in a proportion of less than 0.01% by weight, the corrosive property would not be retarded to an appreciable extent. On the other hand, addition of the zinc carbonate in proportions in excess of 10% by weight would result in poor mechanical strength of the products molded or formed from the resin.

In the second aspect of the invention in which the zinc carbonate agent is employed in combination with an alkaline earth metal chloride, the zinc carbonate and the alkaline earth metal chloride are added in proportions of 0.01%–10% by weight zinc carbonate and 0.006%–23.6% alkaline earth metal chloride on the basis of the total weight of the polyarylene sulfide resin, zinc carbonate and alkaline earth metal chloride. Preferably, the zinc carbonate is added in the range of 0.1–5% by weight and the alkaline earth metal chloride is added in the range of 0.06%–11.8% by weight. Although the relative proportions of the zinc carbonate and alkaline earth metal chloride are not critical, preferably the both are used in equimolar quantities, resulting in significantly advantageous effects.

If the zinc carbonate and alkaline earth metal chloride are added in proportions of less than 0.01% and less than 0.006% by weight, respectively, the corrosive property would not be lowered to an appreciable extent. On the other hand, if the both are added in proportions of greater than 10% and greater than 23.6% by weight, respectively, then the mechanical strength of the products molded or formed from the resin would be poorly decreased.

Examples of the alkaline earth metal chlorides which may be used include beryllium, magnesium, calcium, strontium, barium and radium chlorides which may be either in the anhydrous or hydrated form.

The zinc oxide agent used in the third and fourth aspects of the invention is a compound represented by formula:

$$Zn_xO \cdot nH_2O$$

where x is 1 or 2 and n is from 0 to 6, and which may be prepared by various processes, for example, so-called French process, American process and a wet process for producing zinc flower.

The zinc hydroxide agent used in the third and fourth aspects of the invention is a compound represented by formula

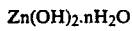

wherein n is from 0 to 6.

In the third aspect of the invention, the zinc oxide and/or zinc hydroxide is added in a proportion of the range 0.01%–10%, preferably 0.1%–5%, by weight on the basis of the total weight of the polyarylene sulfide resin and the zinc oxide and/or zinc hydroxide. If the zinc oxide and/or hydroxide is added in a proportion of less than 0.01% by weight, the corrosive property would not be retarded to an appreciable extent. On the other hand, addition of the zinc oxide and/or hydroxide in proportions in excess of 10% by weight would result in poor mechanical strength of the products molded or formed from the resin.

In the forth aspect of the invention in which the zinc oxide and/or hydroxide is employed in combination with an alkaline earth metal chloride, the zinc oxide and/or hydroxide and the alkaline earth metal chloride are added in proportions of 0.01%–10%, preferably 0.1%–5%, by weight zinc oxide and/or hydroxide and 0.008%–36.5%, preferably 0.08%–18.3%, by weight alkaline earth metal chloride. Although relative proportions of the zinc oxide and/or hydroxide and the alkaline earth metal chloride are not critical, preferably the zinc oxide and/or hydroxide and the alkaline earth metal chloride are used in equimolar quantities, resulting in significantly advantageous effects.

If the zinc oxide and/or hydroxide and the alkaline earth metal chloride are added in proportions of less than 0.01% and less than 0.008% by weight, respectively, the corrosive property would not be lowered to an appreciable extent. On the other hand, if the zinc oxide and/or hydroxide and the alkaline earth metal chloride are added in proportions of greater than 10% and greater than 36.5% by weight, respectively, then the mechanical strength of the products molded or formed from the resin would be poorly decreased.

Examples of the alkaline earth metal chlorides which may be used include beryllium, magnesium, calcium, strontium, barium and radium chlorides which may be either in the anhydrous or hydrated form.

The good solvents for polyarylene sulfide resins which may be used in the invention are organic solvents in which the polyarylene sulfide resins are soluble at room temperature or raised temperatures. Examples which may be mentioned include
N,N'-dimethyl acetamide,
N-ethyl-2-pyrrolidone,
N-methyl-2-pyrrolidone
tetramethyl urea,
N-methyl propionamide,
dimethyl sulfoxide,
1,3-dimethyl imidazolidinone,
α-chloronaphthalene and
diphenyl ether.

The conditions under which the polyarylene sulfide resin is thermally treated with the additive or additives in the good solvent for resin in accordance with the invention may be appropriately selected or varied dependent upon the melt viscosity of resin used, the concentration of solution, the treatment temperature, the treatment time, and the quantity of additive or additives.

Usually the concentration of solution, i.e. "the total weight of the polyarylene sulfide resin and additive or additives/the weight of solvent" ranges from 7% to 50%, preferably 10% to 40%, by weight. If the concentration of solution is lower than 7% by weight, the present methods show an uneconomically low productivity rate. On the other hand, if the concentration is higher than 50% by weight, then any trouble would be expected to occur in the processing apparatus.

The treatment time ranges from one minute to 24 hours, preferably from 10 minutes to 10 hours. If the treatment time is shorter than one minute, the corrosive property would not be appreciably retarded. If the treatment time is longer than 24 hours, the process would not be preferred from an economical point of view. However, the treatment time may be reduced by raising the treatment temperature.

The treatment temperature ranges from 80° C. to 300° C., preferably from 200° C. to 270° C. More preferably, the temperature is such that the polyarylene sulfide resin is dissolved in the system during the thermal treatment. If the treatment temperature is lower than 80° C., the resin would not be sufficiently treated to significantly reduce the corrosive property. If the treatment temperature is higher than 300° C., there would be a risk that the resin is induced to decompose or degradate itself during the treatment.

The present methods may be conducted by appropriately selecting the above-listed ingredients and conditions.

The structure of apparatus in which the present invention is effected is not critical, provided it comprises a vessel fitted with heating means and agitating means. Preferably, the vessel is of a sealed type.

The polyarylene sulfide resin which has been thermally treated in accordance with the present invention may be recovered through further steps, such as removal of solvent, drying and so on.

According to a further aspect of the invention, there is provided an improved polyarylene sulfide resin which has been treated by any one of the present methods.

EXAMPLE

The present invention will be illustrated in more detail with reference to the following non-limiting Examples accompanied with comparative Examples.

In the Examples, the polyarylene sulfide resins were tested for the corrosive properties using the following test method.

Corrosion Test

A PPS powder 5; 10 gr was placed in a weighing bottle 2. On the bed of PPS powder 5, was placed a petri dish 3 in which solder-plated leading frames 4 were disposed. Then the thus assembled weighing bottle 2 was heated at 150° C. for 500 hours in an oven 1. Thereafter, the degree of corrosion on the surfaces of leading frames was visually rated in accordance with the following four grades.
Rating:
I: no discoloration
II: slightly grayish discoloration
III: grayish discoloration
IV: dark discoloration The polyphenylene sulfide resin (referred to as PPS) materials used in the Examples were prepared as follows:

Preparation 1

A 15-l capacity autoclave was charged with 1.8 moles of $Na_2S.2.9H_2O$ and 4.5 kg of N-methyl-2-pyrrolidone (referred to as NMP). The mixture was heated to 200° C. under a stream of nitrogen with stirring so as to distill off 636 g of a distillate consisting mainly of water. The reaction system was cooled down to 170° C., to which 1.8 moles of p-dichlorobenzene was added together with 1.5 kg of NMP. The reaction system was sealed under a stream of nitrogen and heated to 250° C. to allow the reactants to polymerize at this temperature for a period of 3 hours. On completion of the polymerization, the system was cooled and the contents were poured into water so as to precipitate the product polymer. Then the precipitated polymer was collected by means of glass funnel, and then repeatedly washed and filtered using about 10 l of warm water, and thereafter hot-vacuum dried overnight. The thus isolated polymer was obtained in a quantity of 1.85 kg corresponding to a yield of 95%. The polymer had a melt viscosity of 250 poises as measured in a KOHKA type flow tester at 300° C. using an orifice of a 0.5 mm diameter and a 2 mm length under a 10 kg load. This product will be referred to as PPS-1.

Preparation 2

A part of the polymer PPS-1 was placed in an oven set at a temperature of 250° C. Then the material was allowed to cure or crosslink in air for 5 hours within the oven. This procedure produced a PPS having an increased melt viscosity of 2800 poises. This product will be referred to as PPS-2.

EXAMPLES 1-3

A 300 ml-capacity autoclave was charged with NMP, PPS-1 from Preparation 1, and a commercially available basic zinc carbonate manufactured by Wako Junyaku Kogyo Ltd., in various quantities as indicated in Table 1. The inner gaseous space of the autoclave was replaced with nitrogen gas. Then the contents were heated and stirred under the conditions as listed in Table 1. Thereafter, the contents were cooled and the treated polymer was washed with hot water thrice. The polymer was dried at 80° C. for one day. The thus resulting PPS powders were each tested for the corrosive property in accordance with the above-described test procedure. The results are shown in Table 1.

EXAMPLES 4-6

A 300 ml-capacity autoclave was charged with NMP, PPS-1 from Preparation 1, a commercially available basic zinc carbonate manufactured by Wako Junyaku Kogyo Ltd., and barium chloride manufactured by Wako Junyaku, in various quantities as indicated in Table 1. The inner gaseous space of the autoclave was replaced with nitrogen gas. Then the contents were heated and stirred under the conditions as listed in Table 1. Thereafter, the contents were cooled and the treated polymer was washed with hot water thrice. The polymer was dried at 80° C. for one day. The thus resulting PPS powders were each tested for the corrosive property in accordance with the above-described test procedure. The results are shown in Table 1.

EXAMPLES 7-9

The procedure as described in Examples 1-3 was repeated except that PPS-2 from Preparation 2 was used in place of PPS-1 from Preparation 1. Each of the resulting PPS powders was tested for the corrosive property. The results are shown in Table 1.

EXAMPLES 10-12

The procedure as described in Examples 4-6 was repeated except that PPS-2 from Preparation 2 was used in place of PPS-1 from Preparation 1. Each of the resulting PPS powders was tested for the corrosive property. The results are shown in Table 1.

COMPARATIVE EXAMPLE 1

A 300 ml-capacity autoclave was charged with 100 g of NMP and 10 g of PPS-1 from Preparation 1. The inner gaseous space of the autoclave was replaced with nitrogen gas. Then the contents were heated and stirred at 240° C. for 30 minutes. Then the contents were cooled and the treated polymer was washed with hot water thrice. The polymer was dried at 80° C. for one day. The thus resulting PPS powder was tested for the corrosive property in accordance with the above-described test procedure. The results are set forth in Table 2.

COMPARATIVE EXAMPLE 2

The procedure of Comparative Example 1 was repeated except that PPS-2 from Preparation 2 was used in place of PPS-1 from Preparation 1. The resulting PPS powder was tested similarly. The results are set forth in Table 2.

COMPARATIVE EXAMPLE 3

The procedure of Comparative Example 1 was repeated except that calcium carbonate ("Whiton" P-30 available from Shiraishi Kogyo Ltd.) was used in place of the zinc carbonate. The resulting PPS powder was tested similarly. The results are set forth in Table 2.

COMPARATIVE EXAMPLE 4

The procedure of Example 7 was repeated except that calcium carbonate ("Whiton" P-30) was used in place of the zinc carbonate. The resulting PPS powder was tested similarly. The results are set forth in Table 2.

COMPARATIVE EXAMPLE 5

The procedure of Example 4 was repeated except that calcium carbonate ("Whiton" P-30) was used in place of the zinc carbonate. The resulting PPS powder was tested similarly. The results are set forth in Table 2.

COMPARATIVE EXAMPLE 6

The procedure of Example 10 was repeated except that calcium carbonate ("Whiton" P-30) was used in place of the zinc carbonate. The resulting PPS powder was tested similarly. The results are set forth in Table 2.

EXAMPLES 13-15

A 300 ml-capacity autoclave was charged with NMP, PPS-1 from Preparation 1, and zinc oxide (available from Wako Junyaku Kogyo Ltd.) in various quantities as set forth in Table 3. The inner gaseous space of the autoclave was replaced with nitrogen gas. Then the contents were heated and stirred under the conditions as listed in Table 3. Thereafter, the contents were cooled and the treated polymer was washed thrice with hot water and dried at 80° C. for one day. The thus resulting PPS powders were each tested for the corrosive property. The results are set forth in Table 3.

EXAMPLES 16-18

A 300 ml-capacity autoclave was charged with NMP, PPS-1 from Preparation 1, zinc oxide (available from Wako Junyaku Kogyo) and barium chloride (available from Wako Junyaku Kogyo) in various quantities as set forth in Table 3. The inner gaseous space of the autoclave was replaced with nitrogen gas. Then the contents were heated and stirred under the conditions as set forth in Table 3. Thereafter, the contents were cooled and the treated polymer was washed thrice with hot water and dried at 80° C. for one day. The thus resulting PPS powders were each tested for the corrosive property. The results are set forth in Table 3.

EXAMPLES 19-21

The general procedure of Examples 13-15 was repeated except that PPS-2 from Preparation 2 was used in place of PPS-1 from Preparation 1. The resulting PPS powders were each tested for the corrosive property. The results are set forth in Table 3.

EXAMPLES 22-24

The general procedure of Examples 16-18 was repeated except that PPS-2 from Preparation 2 was used in place of PPS-1 from Preparation 1. The resulting PPS powders were each tested similarly. The results are set forth in Table 3.

EXAMPLES 25-27

A 300 ml-capacity autoclave was charged with NMP, PPS-1 and zinc hydroxide (available from Wako Junyaku Kogyo) in various quantities as set forth in Table 4. The inner gaseous space of the autoclave was replaced with nitrogen gas. Then the contents were heated and stirred under the conditions as set forth in Table 4. Thereafter, the contents were cooled and the treated polymer was washed thrice with hot water and dried at 80° C. for one day. The thus resulting PPS powders were each tested for the corrosive property. The results are set forth in Table 4.

EXAMPLES 28-30

A 300 ml-capacity autoclave was charged with NMP, PPS-1 and zinc hydroxide (available from Wako Junyaku Kogyo) and barium chloride (available from Wako Junyaku Kogyo) in various quantities as set forth in Table 4. Then the contents were heated and stirred under the conditions as set forth in Table 4. Thereafter, the contents were cooled and the treated polymer was washed thrice with hot water and dried at 80° C. for one day. The thus resulting PPS powders were each tested for the corrosive property. The results are set forth in Table 4.

EXAMPLES 31-33

The general procedure of Examples 25-27 was repeated except that PPS-2 from Preparation 2 was used in place of PPS-1 from Preparation 1. The resulting PPS powders were each tested for the corrosive property. The results are set forth in Table 4.

EXAMPLES 34-36

The general procedure of Examples 28-30 was repeated except that PPS-2 from Preparation 2 was used in place of PPS-1 from Preparation 1. The resulting PPS powders were each tested for the corrosive property. The results are set forth in Table 4.

EXAMPLE 37

A 300 ml-capacity autoclave was charged with NMP, PPS-1 from Preparation 1, zinc oxide (available from Wako Junyaku Kogyo) and zinc hydroxide (available from Wako Junyaku Kogyo) in quantities as set forth in Table 5. The inner gaseous space of the autoclave was replaced with nitrogen gas. Then the contents were heated and stirred under the conditions as set forth in Table 5. Thereafter, the contents were cooled and the treated polymer was washed thrice with hot water and dried at 80° C. for one day. The thus resulting PPS powder was tested for the corrosive property. The results are set forth in Table 5.

EXAMPLE 38

A 300 ml-capacity autoclave was charged with NMP, PPS-1, zinc oxide (from Wako), zinc hydroxide (from Wako) and barium chloride (from Wako) in quantities as set forth in Table 5. The inner gaseous space of the autoclave was replaced with nitrogen gas. Then the contents were heated and stirred under the conditions as set forth in Table 5. The autoclave was cooled and the treated polymer was washed thrice with hot water and dried at 80° C. for one day. The thus resulting PPS powder was tested for the corrosive property. The results are set forth in Table 5.

COMPARATIVE EXAMPLE 7

The procedure of Example 13 was repeated except that calcium carbonate ("Whiton" P-30) was used in place of the zinc oxide. The resulting PPS powder was tested for the corrosive property. The results are set forth in Table 6.

COMPARATIVE EXAMPLE 8

The procedure of Example 19 was repeated except that calcium carbonate ("Whiton" P-30) was used in place of the zinc oxide. The resulting PPS powder was tested for the corrosive property. The results are set forth in Table 6.

COMPARATIVE EXAMPLE 9

The procedure of Example 16 was repeated except that calcium carbonate ("Whiton" P-30) was used in place of the zinc oxide. The resulting PPS powder was tested for the corrosive property. The results are set forth in Table 6.

COMPARATIVE EXAMPLE 10

The procedure of Example 22 was repeated except that calcium carbonate ("Whiton" P-30) was used in place of the zinc oxide. The resulting PPS powder was tested for the corrosive property. The results are set forth in Table 6.

As above-illustrated, according to the present invention, the corrosive property of polyarylene sulfide resins is effectively reduced to a very significant extent by relatively simple and economical means. The treated polyarylene sulfide resins according to the invention are expected to be useful and advantageous in the field where the metal corrosion problems were experienced with the conventional polyarylene sulfide materials.

TABLE 1

| Examples | PPS (Preparation No.) | | Zinc carbonate | Barium chloride | Calcium carbonate | NMP | Temp. (°C.) | Time (mins.) | Corrosion Test |
|---|---|---|---|---|---|---|---|---|---|
| 1 | 9.50 | (1) | 0.50 | — | — | 100 | 240 | 30 | II |
| 2 | 9.50 | (1) | 0.50 | — | — | 100 | 200 | 30 | II |
| 3 | 9.90 | (1) | 0.10 | — | — | 100 | 240 | 30 | II |
| 4 | 8.67 | (1) | 0.50 | 0.83 | — | 100 | 240 | 30 | I |
| 5 | 8.67 | (1) | 0.50 | 0.83 | — | 100 | 200 | 30 | I |
| 6 | 9.74 | (1) | 0.10 | 0.16 | — | 100 | 240 | 30 | II |
| 7 | 9.50 | (2) | 0.50 | — | — | 100 | 240 | 30 | I |
| 8 | 9.50 | (2) | 0.50 | — | — | 100 | 200 | 30 | II |
| 9 | 9.90 | (2) | 0.10 | — | — | 100 | 240 | 30 | II |
| 10 | 8.67 | (2) | 0.50 | 0.83 | — | 100 | 240 | 30 | I |
| 11 | 8.67 | (2) | 0.50 | 0.83 | — | 100 | 200 | 30 | I |
| 12 | 9.74 | (2) | 0.10 | 0.16 | — | 100 | 240 | 30 | I |

TABLE 2

| Comp. Examples | PPS (Preparation No.) | | Zinc carbonate | Barium chloride | Calcium carbonate | NMP | Temp. (°C.) | Time (mins.) | Corrosion Test |
|---|---|---|---|---|---|---|---|---|---|
| 1 | 10.00 | (1) | — | — | — | 100 | 240 | 30 | IV |
| 2 | 10.00 | (2) | — | — | — | 100 | 240 | 30 | IV |
| 3 | 9.50 | (1) | — | — | 0.50 | 100 | 240 | 30 | IV |
| 4 | 9.50 | (2) | — | — | 0.50 | 100 | 240 | 30 | IV |
| 5 | 8.67 | (1) | — | 0.83 | 0.50 | 100 | 240 | 30 | III |
| 6 | 8.67 | (2) | — | 0.83 | 0.50 | 100 | 240 | 30 | III |

TABLE 3

| Examples | PPS (Preparation No.) | | Zinc oxide | Barium chloride | NMP | Temp. (°C.) | Time (mins.) | Corrosion Test |
|---|---|---|---|---|---|---|---|---|
| 13 | 9.50 | (1) | 0.50 | — | 100 | 240 | 30 | II |
| 14 | 9.50 | (1) | 0.50 | — | 100 | 200 | 30 | II |
| 15 | 9.90 | (1) | 0.10 | — | 100 | 240 | 30 | II |
| 16 | 8.23 | (1) | 0.50 | 1.27 | 100 | 240 | 30 | I |
| 17 | 8.23 | (1) | 0.50 | 1.27 | 100 | 200 | 30 | I |
| 18 | 9.65 | (1) | 0.10 | 0.25 | 100 | 240 | 30 | II |
| 19 | 9.50 | (2) | 0.50 | — | 100 | 240 | 30 | I |
| 20 | 9.50 | (2) | 0.50 | — | 100 | 200 | 30 | II |
| 21 | 9.90 | (2) | 0.10 | — | 100 | 240 | 30 | II |
| 22 | 8.23 | (2) | 0.50 | 1.27 | 100 | 240 | 30 | I |
| 23 | 8.23 | (2) | 0.50 | 1.27 | 100 | 200 | 30 | I |
| 24 | 9.65 | (2) | 0.10 | 0.25 | 100 | 240 | 30 | I |

TABLE 4

| Examples | PPS (Preparation No.) | | Zinc hydroxide | Barium chloride | NMP | Temp. (°C.) | Time (mins.) | Corrosion Test |
|---|---|---|---|---|---|---|---|---|
| 25 | 9.50 | (1) | 0.50 | — | 100 | 240 | 30 | II |
| 26 | 9.50 | (1) | 0.50 | — | 100 | 200 | 30 | II |
| 27 | 9.90 | (1) | 0.10 | — | 100 | 240 | 30 | II |
| 28 | 8.46 | (1) | 0.50 | 1.04 | 100 | 240 | 30 | I |
| 29 | 8.46 | (1) | 0.50 | 1.04 | 100 | 200 | 30 | I |
| 30 | 9.69 | (1) | 0.10 | 0.21 | 100 | 240 | 30 | II |
| 31 | 9.50 | (2) | 0.50 | — | 100 | 240 | 30 | I |
| 32 | 9.50 | (2) | 0.50 | — | 100 | 200 | 30 | II |
| 33 | 9.90 | (2) | 0.10 | — | 100 | 240 | 30 | II |
| 34 | 8.46 | (2) | 0.50 | 1.04 | 100 | 240 | 30 | I |
| 35 | 8.46 | (2) | 0.50 | 1.04 | 100 | 200 | 30 | I |
| 36 | 9.69 | (2) | 0.10 | 0.21 | 100 | 240 | 30 | I |

TABLE 5

| Examples | PPS (Preparation No.) | | Zinc hydroxide | Zinc oxide | Barium chloride | NMP | Temp. (°C.) | Time (mins.) | Corrosion Test |
|---|---|---|---|---|---|---|---|---|---|
| 37 | 9.00 | (1) | 0.50 | 0.50 | — | 100 | 240 | 30 | I |

TABLE 5-continued

| 38 | 6.69 | (1) | 0.50 | 0.50 | 2.31 | 100 | 240 | 30 | I |

TABLE 6

| Comp. Examples | Formulation (g) | | | | Treating conditions | | | Corrosion Test |
|---|---|---|---|---|---|---|---|---|
| | PPS (Preparation No.) | Barium chloride | Calcium carbonate | NMP | Temp. (°C.) | Time (mins.) | | |
| 7 | 9.39 | (1) | — | 0.61 | 100 | 240 | 30 | IV |
| 8 | 9.39 | (2) | — | 0.61 | 100 | 240 | 30 | IV |
| 9 | 8.12 | (1) | 1.27 | 0.61 | 100 | 240 | 30 | III |
| 10 | 8.12 | (2) | 1.27 | 0.61 | 100 | 240 | 30 | III |

What is claimed is:

1. A method for treating polyarylene sulfide resins which comprises mixing and heating a polyarylene sulfide resin with zinc carbonate in the presence of a good solvent for said resin, the zinc carbonate being present in a proportion of 0.01%–10% by weight on the basis of the total weight of the resin and zinc carbonate.

2. A method as claimed in claim 1 wherein the proportion of zinc carbonate is in the range of 0.1%–5% by weight on the basis of the total weight of the resin and zinc carbonate.

3. A method for treating polyarylene sulfide resins which comprises mixing and heating a polyarylene sulfide resin with zinc carbonate and an alkaline earth metal chloride in the presence of a good solvent for said resin the zinc carbonate and alkaline earth metal chloride being present in proportions of 0.01%–10% and 0.006%–23.6% by weight, respectively, on the basis of the total weight of the resin, zinc carbonate and alkaline earth metal chloride.

4. A method as claimed in claim 3 wherein the proportions of zinc carbonate and alkaline earth metal chloride are 0.1%–5% and 0.06%–11.8% by weight, respectively, on the basis of the total weight of the resin, zinc carbonate and alkaline earth metal chloride.

5. A method as claimed in claim 1 or 3 wherein the zinc carbonate is represented by formula $$xZnCO_3 \cdot yZn(OH)_2 \cdot nH_2O$$

where x is from 1 to 3, y is from 0 to 6 and n is from 0 to 6.

6. A method for treating polyarylene sulfide resin which comprises mixing and heating a polyarylene sulfide resin with a member selected from the group consisting of zinc oxide, zinc hydroxide and zinc oxide plus zinc hydroxide in the presence of a good solvent for the resin, the member selected from the group consisting of zinc oxide, zinc hydroxide and zinc oxide plus zinc hydroxide being present in a proportion of 0.01%–10% by weight on the basis of the total weight of the resin and the member selected from the group consisting of zinc oxide, zinc hydroxide and zinc oxide plus zinc hydroxide.

7. A method as claimed in claim 6 wherein the proportion of the member selected from the group consisting of zinc oxide, zinc hydroxide and zinc oxide plus zinc hydroxide is in the range of 0.1%–5% by weight on the basis of the total weight of the resin and the member selected from the group consisting of zinc oxide, zinc hydroxide and zinc oxide plus zinc hydroxide.

8. A method for treating polyarylene sulfide resin which comprises mixing and heating a polyarylene sulfide resin with a member selected from the group consisting of zinc oxide, zinc hydroxide and zinc oxide plus zinc hydroxide, and an alkaline earth metal chloride in the presence of a good solvent for the resin, the member selected from the group consisting of zinc oxide, zinc hydroxide and zinc oxide plus zinc hydroxide and the alkaline earth metal chloride are present in proportions of 0.01%–10% and 0.008%–36.5% by weight, respectively, on the basis of the total weight of the resin, the member selected from the group consisting of zinc oxide, zinc hydroxide and zinc oxide plus zinc hydroxide, and alkaline earth metal chloride.

9. A method as claimed in claim 8, wherein the proportions of the member selected from the group consisting of zinc oxide, zinc hydroxide and zinc oxide plus zinc hydroxide and of alkaline earth metal chloride are 0.1%–5% and 0.08%–18.3% by weight, respectively, on the basis of the total weight of the resin, the member selected from the group consisting of zinc oxide, zinc hydroxide and zinc oxide plus zinc hydroxide and alkaline earth metal chloride.

10. A method as claimed in claim 6 or 8 wherein the zinc oxide is represented by formula $$Zn_xO \cdot nH_2O$$

where x is 1 or 2 and n is from 0 to 6, and the zinc hydroxide is represented by formula $$Zn(OH)_2 \cdot nH_2O$$

wherein n is from 0 to 6.

11. A method as claimed in claim 3 or 8 wherein the alkaline earth metal chloride is selected from the group consisting of beryllium, magnesium, calcium, strontium, barium and radium chlorides and is either in the anhydrous or hydrated form.

12. A method as claimed in claim 3 or 8 where the alkaline earth metal chloride is barium chloride either in the anhydrous or hydrated form.

13. A method as claimed in any one of claims 1, 3, 6 and 8 wherein the solvent comprises an organic solvent selected from the group consisting of
N,N'-dimethyl acetamide,
N-ethyl-2-pyrrolidone,
N-methyl-2-pyrrolidone
tetramethyl urea,
N-methyl propionamide,
dimethyl sulfoxide,
1,3-dimethyl imidazolidinone,
α-chloronaphthalene and
diphenyl ether.

14. A method as claimed in any one of claims 1, 3, 6 and 8 wherein the solvent is selected from the group consisting of
N-methyl-2-pyrrolidone, 1,3-dimethyl imidazolidinone,
α-chloronaphthalene and
diphenyl ether.

15. A method as claimed in any one of claims 1, 3, 6 and 8 wherein the total concentration of the resin and treating agent or agents in the solvent ranges from 7% to 50% by weight.

16. A method as claimed in claim 15 wherein the concentration ranges from 10% to 40% by weight.

17. A method as claimed in any one of claims 1, 3, 6 and 8 wherein the treatment is for a period of from 1 minute to 24 hours at a temperature in the range of from 80° C. to 300° C.

18. A method as claimed in claim 17 wherein the treatment is for a period of from 10 minutes to 10 hours at a temperature of 200° C. to 270° C.

19. A method as claimed in any one of claims 1, 3, 6 and 8 wherein the resin has a melt viscosity of 100–30,000 poises.

20. A method as claimed in any one of claims 1, 3, 6, and 8 wherein the resin is one having a melt viscosity of 150–50,000 poises which has been prepared by heating and further polymerizing a polyarylene sulfide resin having a lower melt viscosity of 50–20,000 poises.

21. A method as claimed in any one of claims 1, 3, 6 and 8 which comprises a further step of removing the solvent from the treated resin.

22. A method as claimed in claim 21 which comprises a further step of drying the treated resins.

* * * * *